June 1, 1937.  C. B. JOHNSON  2,082,632
VISOR CONSTRUCTION
Filed Nov. 7, 1934
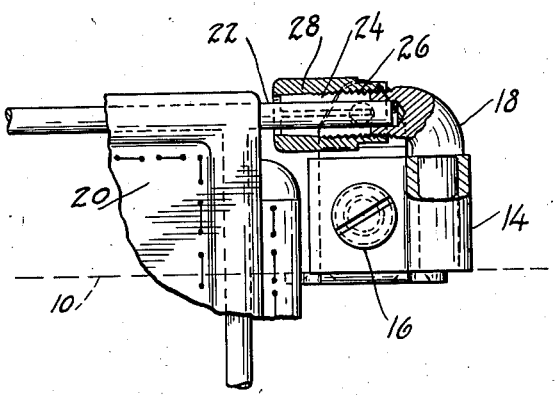
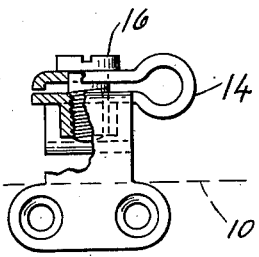
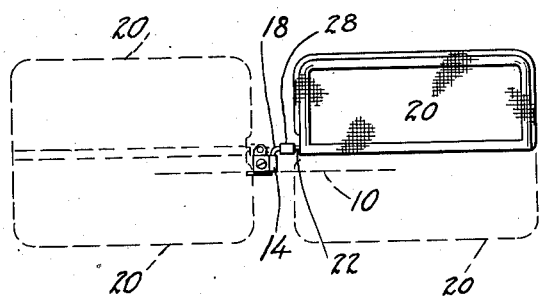
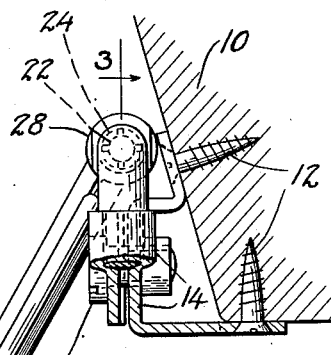
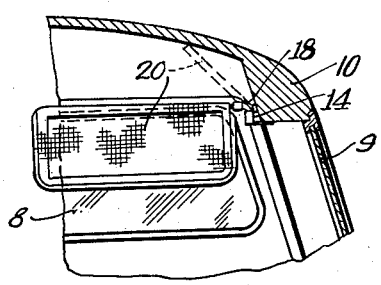
INVENTOR.
Charles Bayard Johnson
BY Parker & Burton
ATTORNEYS.

Patented June 1, 1937

2,082,632

UNITED STATES PATENT OFFICE 2,082,632

VISOR CONSTRUCTION

Charles Bayard Johnson, Monroe, Mich., assignor to Woodall Industries Incorporated, Detroit, Mich., a corporation of Michigan Application November 7, 1934, Serial No. 751,929

5 Claims. (Cl. 296—97)

My invention relates to improvements in visor construction for vehicle bodies and particularly to that type of visor which is employed in the interior of an automobile body and adapted to be moved to overlie the windshield while in one position and to have a second position overlying the side window which is immediately at the rear of the windshield.

The invention relates primarily to the mounting or support of the visor and an object is to provide a simple, inexpensive, rugged, type of mounting which will support the visor at adjusted positions and which occupies a minimum amount of space and possesses a neat finished appearance. The mounting is preferably secured to the header which surmounts the windshield and it is adapted to support the visor in a position of non-use above the windshield or in a plurality of positions of use overlying the windshield or in another position of use overlying the side window.

Various other objects, advantages, and meritorious features of my invention will more fully appear from the following description, appended claims, and accompanying drawing, wherein;

Figure 1 is a schematic illustration showing the visor in a full position surmounting the windshield and illustrating its swinging movement, Fig. 2 is an elevation of the visor showing the same in position overlying the windshield and showing the construction of the supporting mechanism, Fig. 3 is an enlarged sectional view through the visor supporting mechanism showing a fragmentary portion of the visor, Fig. 4 is a sectional view through the visor supporting bracket, and Fig. 5 is an elevation of a visor in place in a vehicle body overlying the side window.

The visor is adapted for use in automobile bodies of conventional construction, the header of which is indicated as 10. A windshield 9 is positioned below the header and the body has the usual side windows 8 arranged rearwardly of the windshield. The visor itself is supported by the header through the means of a bracket which is secured to the header by screws 12. This bracket comprises a portion 14 which forms a pivotal support arranged vertically as illustrated in Fig. 2. A set screw 16 is employed to adjust this yielding pivot portion to grippingly engage about one leg of a clamping member 18. This leg of the clamping member forms the vertical pivot for the swinging movement of the visor.

The visor panel itself is indicated as 20 and it has at one upper corner a projecting pivot portion 22. The visor may be of the construction generally illustrated in United States Patent 1,963,393.

The other leg of the angular clamping member is fashioned to form a slit tube 24 which is tapered on its outer surface and threaded as at 26. An internally threaded sleeve 28 is received thereover and adjustable to tighten the slit tubular end of the angular clamping element about the pivot portion 22 of the visor whereby the visor may be resistingly rotated about this horizontal pivot from a position such as shown in solid line in Fig. 1 above the windshield to a position such as shown in solid line in Fig. 2 overlying the windshield. The dotted line position of Fig. 1 immediately below the solid line position of the vistor illustrated conforms with the solid line position shown in Fig. 2 but the two dotted line positions to the left are merely shown to illustrate that the visor may be swung about a vertical pivot and adjusted to an angularity of positions about the horizontal pivot, but owning to the side of the car these positions at the left would be normal to the plane of the positions at the right rather than in parallelism as might appear in Fig. 1.

In order that the entire mechanism may occupy as little space as possible and present a neat appearance the bracket is secured to the header between the legs of the clamping member or rather between the one leg of the clamping member and the visor and underneath the pivot of the visor.

It is apparent that the visor may be swung from the position to which it is shown in Fig. 2 to a position such as shown in solid line in Fig. 1 so that it can either overlie the windshield or be supported in the position of non-use above the windshield. It is likewise apparent that the visor may be moved from either of these positions to a position parallel with the side window by being swung about the other leg of the clamping mechanism as a pivot and that through this permitted range of adjustment the visor may be employed to shield either the side window or the windshield or moved to a position of non-use.

What I claim is:

1. Visor mechanism for a vehicle body having a windshield and a side window comprising a visor panel having a pivot portion, a supporting bracket secured to the body above the windshield, an angular clamping member having one leg in the form of a slit tube grippingly held about said pivot portion permitting swinging movement of the visor from a position overlying the windshield to a position thereabove, said clamping member having another leg grippingly engaged by said bracket to be swung to permit adjustment of the visor from a position overlying the windshield to a position overlying a side window.

2. Visor mechanism for a vehicle body having a windshield and a side window comprising a visor panel having a pivot portion, a supporting bracket secured to the body above the windshield, an angular clamping member having one leg in the form of a slit tube grippingly held about said pivot portion permitting swinging movement of the visor from a position overlying the windshield to a position thereabove, said clamping member having a second leg grippingly engaged by said bracket to be swung to permit adjustment of the visor from a position overlying the windshield to a position overlying a side window, said bracket being disposed between the legs of the clamping member adjacent to and underneath the visor pivot.

3. Visor mechanism for a vehicle body having a windshield and a side window comprising a visor panel having a pivot portion, a supporting bracket secured to the body above the windshield, an angular clamping member having one leg in the form of a slit tube receiving said visor pivot, a part engaging said tube holding it grippingly about said pivot to permit resisted swinging movement fo the visor from a point above the windshield to a position overlying the windshield, said clamping member having its other leg grippingly engaged by said bracket to be resistingly swung therabout to permit adjustment of the visor from a position overlying the windshield to a position overlying a side window, said bracket being secured in place between said last mentioned leg and the visor underneath the visor pivot.

4. Visor mechanism for a vehicle body having a windshield and a side window comprising a visor panel having a pivot portion, a supporting bracket secured to the body above the windshield, an angular clamping member having a slit tubular tapered leg adapted to receive said pivot member and provided with a part threaded thereupon compressing the tubular leg grippingly about the pivot permitting resisted pivotal movement thereof for adjustment of the visor to a position overlying the windshield or to a position above the windshield, said bracket having a portion formed to be engaged with the other leg of the clamping member and provided with means adapted to hold the same grippingly thereabout permitting resisted pivotal movement thereof for adjustment of the visor to a position overlying the side window.

5. Visor mechanism for a vehicle body having a windshield, a side window, and a header above the windshield comprising, in combination, a visor panel having a projecting pivot portion, a supporting bracket secured to the header, an angular clamping member having one leg pivotally secured to the bracket to permit swinging movement of said member to a position parallel to the header or to a position substantially normal thereto, said other leg of the clamping member being tubular, compressible and externally tapered and adapted to receive the visor pivot and provided with a part received thereabout and adapted to urge the same compressibly about the pivot to permit rotatable movement of the pivot member and to hold the same in adjusted position of rotation.

CHARLES BAYARD JOHNSON.